(12) United States Patent
Scott et al.

(10) Patent No.: US 11,372,400 B1
(45) Date of Patent: Jun. 28, 2022

(54) UNMANNED VEHICLE MORPHING

(71) Applicant: UIPCO, LLC, San Antonio, TX (US)

(72) Inventors: Kade Scott, The Colony, TX (US);
Snehal Desai, Richardson, TX (US);
Richard Daniel Graham, Plano, TX
(US); Matthew Flachsbart, Grapevine,
TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 89 days.

(21) Appl. No.: 16/143,653

(22) Filed: Sep. 27, 2018

Related U.S. Application Data

(63) Continuation of application No. 15/422,771, filed on Feb. 2, 2017, now Pat. No. 10,162,348.

(60) Provisional application No. 62/291,317, filed on Feb. 4, 2016.

(51) Int. Cl.
| | |
|---|---|
| *G05D 1/00* | (2006.01) |
| *B64C 37/00* | (2006.01) |
| *B64C 39/02* | (2006.01) |
| *B60F 5/02* | (2006.01) |
| *B60F 5/00* | (2006.01) |

(52) U.S. Cl.
CPC .......... *G05D 1/0016* (2013.01); *B60F 5/003* (2013.01); *B60F 5/02* (2013.01); *B64C 37/00* (2013.01); *B64C 39/024* (2013.01); *G05D 1/0027* (2013.01); *B64C 2201/024* (2013.01); *B64C 2201/108* (2013.01); *B64C 2201/146* (2013.01)

(58) Field of Classification Search
None
See application file for complete search history.

(56) References Cited

U.S. PATENT DOCUMENTS

| | | | | | |
|---|---|---|---|---|---|
| 4,174,863 | A * | 11/1979 | Gotz | ...................... | B60J 1/2008 296/180.5 |
| 4,267,987 | A * | 5/1981 | McDonnell | ............ | B64D 39/00 244/137.4 |
| 4,422,606 | A * | 12/1983 | Munroe | ................... | B64C 13/16 244/203 |
| 7,658,346 | B2 * | 2/2010 | Goossen | .................. | B64C 27/20 244/17.11 |
| 8,950,698 | B1 * | 2/2015 | Rossi | ................... | B64C 29/0033 244/2 |
| 9,061,558 | B2 * | 6/2015 | Kalantari | ................ | A63H 27/12 |
| 9,145,207 | B2 * | 9/2015 | Moschetta | ............... | B64C 25/36 |
| 2009/0045290 | A1 * | 2/2009 | Small | ..................... | B64C 39/024 244/135 A |
| 2009/0230723 | A1 * | 9/2009 | Huang | ...................... | B60J 10/80 296/146.9 |
| 2010/0193626 | A1 * | 8/2010 | Goossen | .................. | B64C 37/00 244/2 |
| 2011/0042507 | A1 * | 2/2011 | Seiford, Sr. | ................ | B60F 5/02 244/2 |

(Continued)

FOREIGN PATENT DOCUMENTS

EP  2 664 539  * 11/2013

*Primary Examiner* — Navid Z. Mehdizadeh
(74) *Attorney, Agent, or Firm* — BakerHostetler

(57) ABSTRACT

Unmanned vehicles may be terrestrial, aerial, nautical, or multi-mode. Unmanned vehicles may accomplish tasks by breaking out into sub-drones, re-grouping itself, changing form, or re-orienting its sensors.

16 Claims, 16 Drawing Sheets

(56) References Cited

U.S. PATENT DOCUMENTS

| | | | |
|---|---|---|---|
| 2011/0163197 A1* | 7/2011 | Farrag | B60F 5/02 244/2 |
| 2011/0315806 A1* | 12/2011 | Piasecki | B64C 27/32 244/2 |
| 2012/0174571 A1* | 7/2012 | Villanueva | F03G 7/065 60/527 |
| 2012/0292435 A1* | 11/2012 | Karem | B64C 1/00 244/36 |
| 2013/0068876 A1* | 3/2013 | Radu | B60F 5/02 244/2 |
| 2013/0126666 A1* | 5/2013 | Brown | B60F 5/02 244/2 |
| 2013/0206915 A1* | 8/2013 | Desaulniers | B64C 39/028 244/165 |
| 2014/0061362 A1* | 3/2014 | Olm | B64C 39/024 244/2 |
| 2014/0231593 A1* | 8/2014 | Karem | B64C 1/0009 244/45 R |
| 2015/0028150 A1* | 1/2015 | Klein | B64C 3/56 244/2 |
| 2015/0203184 A1* | 7/2015 | Sarmiento | B64B 1/24 244/30 |
| 2015/0266576 A1* | 9/2015 | Hobbart | B60F 3/0007 244/2 |
| 2015/0353206 A1* | 12/2015 | Wang | B60R 9/00 244/114 R |
| 2016/0122012 A1* | 5/2016 | Choo | B64C 39/028 244/17.23 |
| 2016/0159472 A1* | 6/2016 | Chan | B64C 27/08 244/39 |
| 2016/0214717 A1* | 7/2016 | De Silva | G05D 1/104 |
| 2016/0232794 A1* | 8/2016 | Hafeez | G08G 5/0034 |
| 2016/0244187 A1* | 8/2016 | Byers | B64C 39/024 |
| 2016/0304217 A1* | 10/2016 | Fisher | B64F 1/222 |
| 2016/0378108 A1* | 12/2016 | Paczan | B64C 37/02 705/330 |
| 2017/0144757 A1* | 5/2017 | Hall | G06F 3/04847 |
| 2018/0044015 A1* | 2/2018 | Kim | B64C 25/52 |
| 2018/0231971 A1* | 8/2018 | Greenberger | B64C 39/024 |
| 2019/0193952 A1* | 6/2019 | Zevenbergen | B65G 47/92 |
| 2019/0227542 A1* | 7/2019 | Cantrell | G05D 1/0094 |
| 2019/0229462 A1* | 7/2019 | Hodgson | G01B 21/00 |

\* cited by examiner

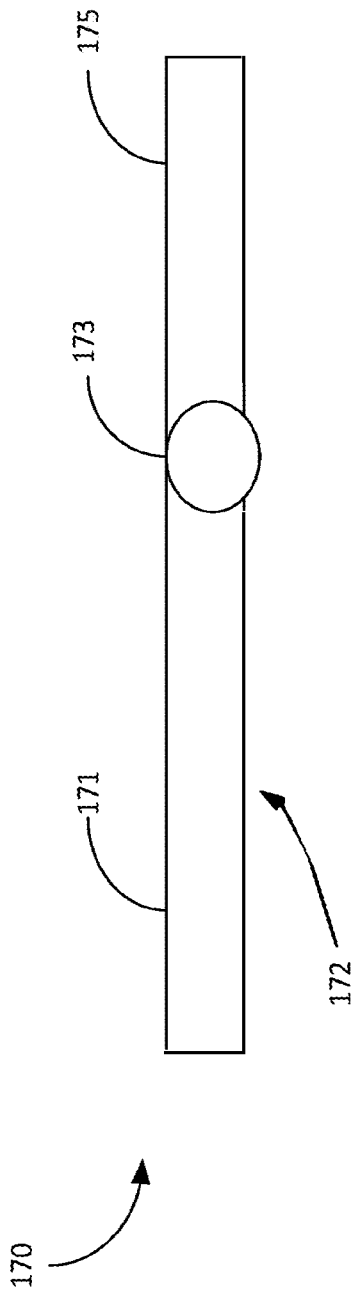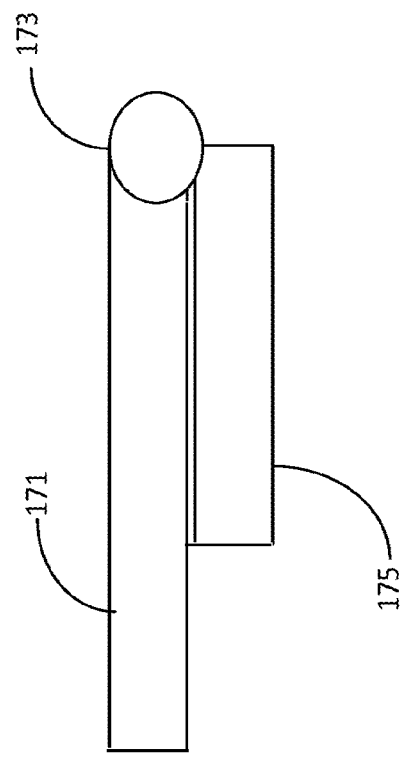

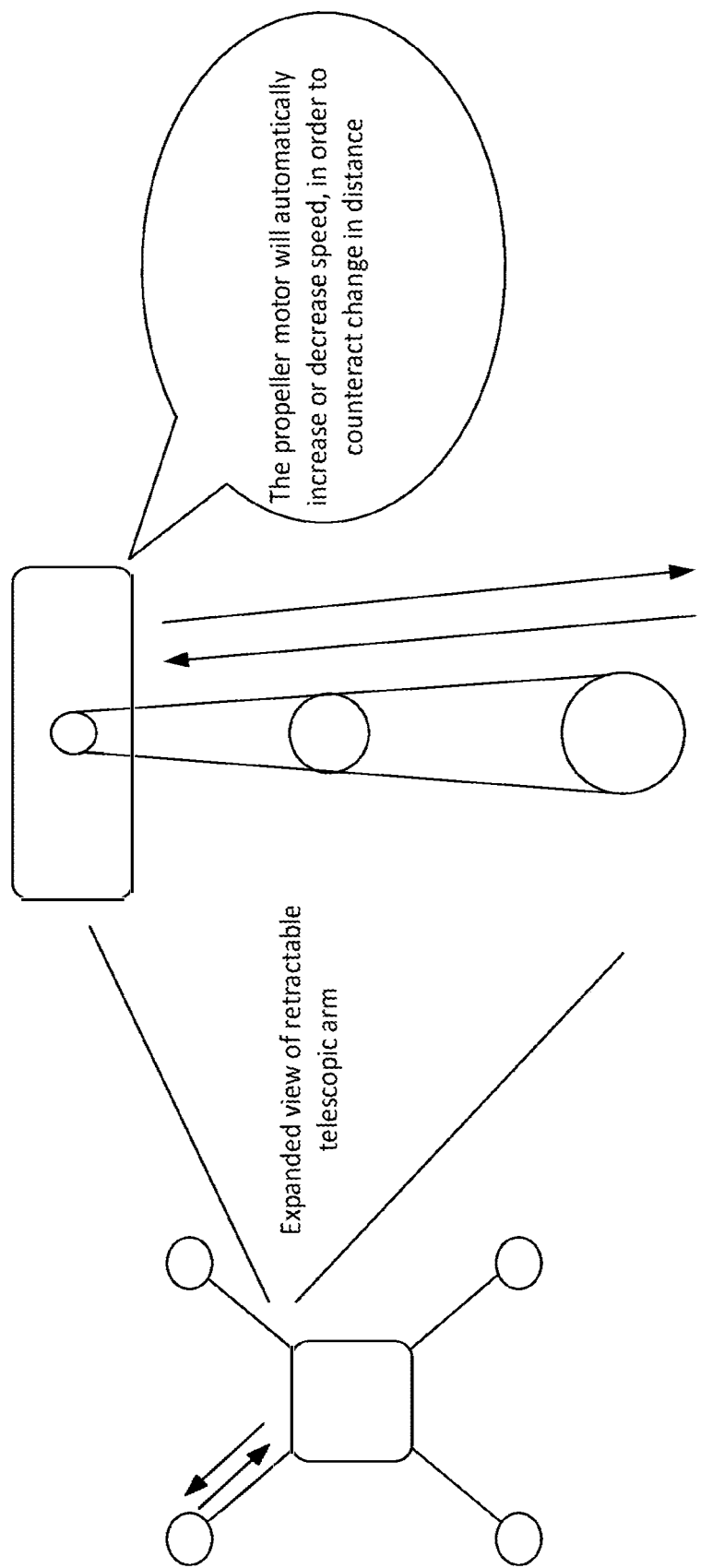

UNMANNED VEHICLE MORPHING

CROSS-REFERENCE TO RELATED APPLICATION

This application claims priority to, and is a continuation of U.S. patent application Ser. No. 15/422,771, filed Feb. 2, 2017, which claims priority to and the benefit of U.S. Provisional Patent Application No. 62/291,317, filed on Feb. 4, 2016, entitled "Nestable UAV's; Polymorphic UAV's; Shared Distributed Flight," the contents of which are hereby incorporated by reference herein.

BACKGROUND OF THE INVENTION

Unmanned vehicles (e.g., unmanned aerial vehicles) are known for their use in combat zones. In combat zones, they are often used to surveil an area, damage structures, or lethally wound a potential enemy combatant. The use of unmanned vehicles can go far beyond the aforementioned examples, especially outside of a combat zone and in a commercial setting. Businesses of all sorts are now developing innovative ways to use unmanned vehicles to benefit their business.

SUMMARY

Unmanned vehicles (UV) can be terrestrial, aerial, nautical, or multi-mode. UVs will become increasingly commonplace for doing tasks in the future. A number of such tasks may be better accomplished if the UV has the ability to break out into sub-drones, re-group itself, change form, or re-orient its sensors. This morphing of the drone may happen based on the unmanned vehicle sensing certain conditions. Discussed in more detail herein are polymorphic UVs, UV motherships, and nestable UVs, among other things.

In an example, a mothership system may include a mothership device communicatively connected with a plurality of detachable unmanned vehicles via a plurality of arms.

In another example, a method for morphing based on a shared flight path may include nesting a plurality of unmanned vehicles based on the shared flight path and related data and a method for responsiveness to arriving at a first area along the shared flight path, detaching at least one of the plurality of unmanned vehicles based on the shared flight path and related data. The at least one of the plurality of unmanned vehicles may share a mapping of an assigned second area according to the flight path and related data with one or more of the plurality of unmanned vehicles.

In another example, a method for morphing an unmanned vehicle may include programming a polymorphic material to transform based on a condition and responding to detecting the condition within a threshold, instructing an unmanned vehicle to morph to avoid damage or maneuver within a space.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 4A illustrates an exemplary side view of a folding propeller blade;

FIG. 4B illustrates an example of an extended blade folded and connected with magnetized ventral side of the blade portion;

FIG. 7A illustrates an exemplary telescopic arm morphing;

FIG. 7B illustrates an exemplary telescopic arm morphing;

DETAILED DESCRIPTION

Unmanned vehicles (UV) can be terrestrial, aerial, nautical, or multi-mode. UVs will become increasingly commonplace for doing tasks in the future. A number of such tasks may be better accomplished if the UV has the ability to break out into sub-drones, re-group itself, change form, or re-orient its sensors. This morphing of the unmanned vehicle may happen based on the unmanned vehicle sensing certain conditions. Discussed in more detail herein are polymorphic UVs, UV motherships, and nestable UVs, among other things.

Figure 1:
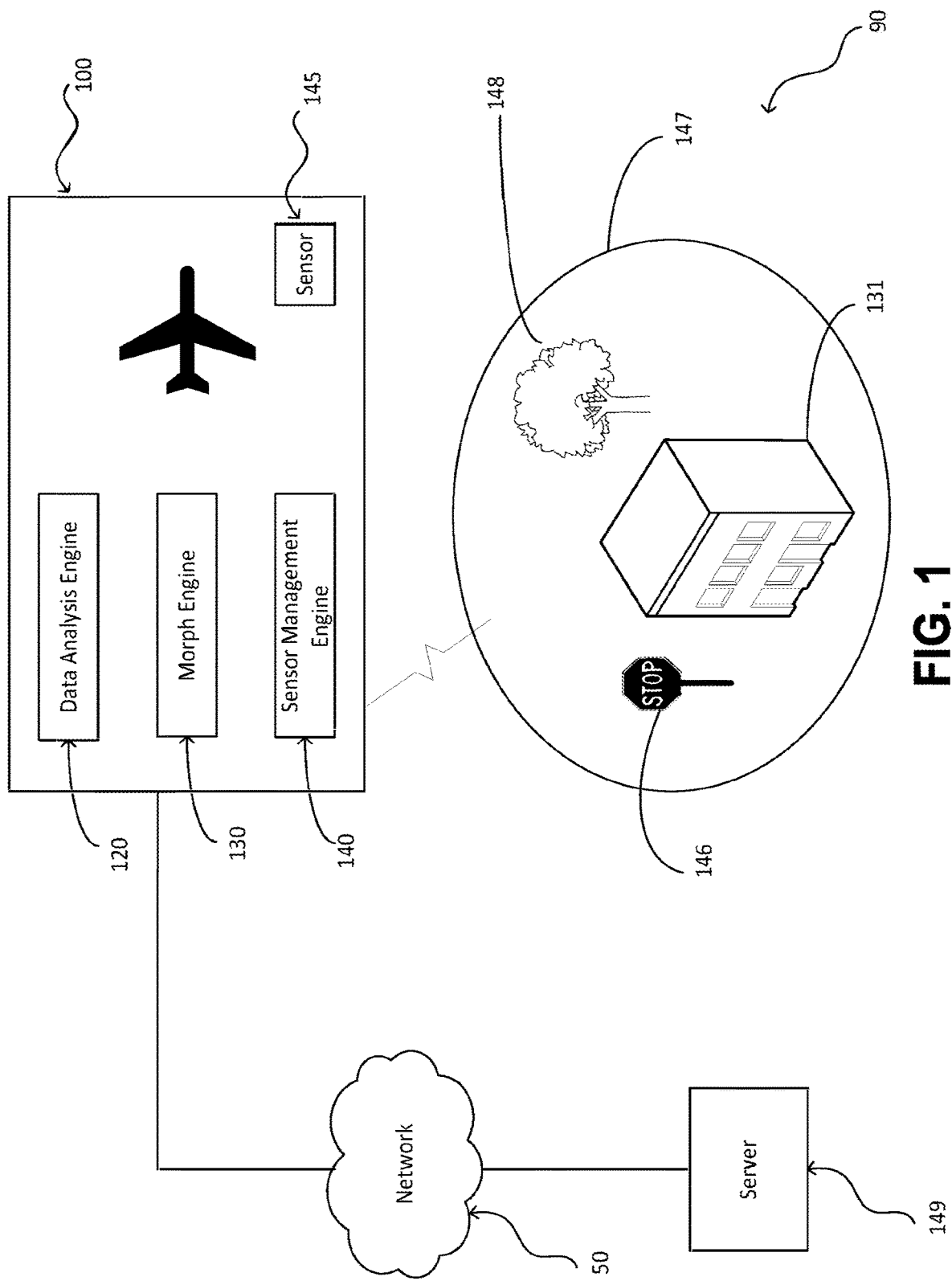
FIG. 1 illustrates an exemplary system associated with morphing of an unmanned vehicle.

FIG. 1 illustrates an exemplary system 90 associated with morphing of an unmanned vehicle. Unmanned vehicle 100 includes sensor 145, data analysis engine 120, morph engine 130, and sensor management engine 140. Unmanned vehicle 100 may be communicatively connected with network 50 and server 149. A business (e.g., an insurance provider) may own or have control of unmanned vehicle 100, network 50, or server 149. Structure 131 (e.g., office building, warehouse, or home) is located in area 147.

Figure 16:
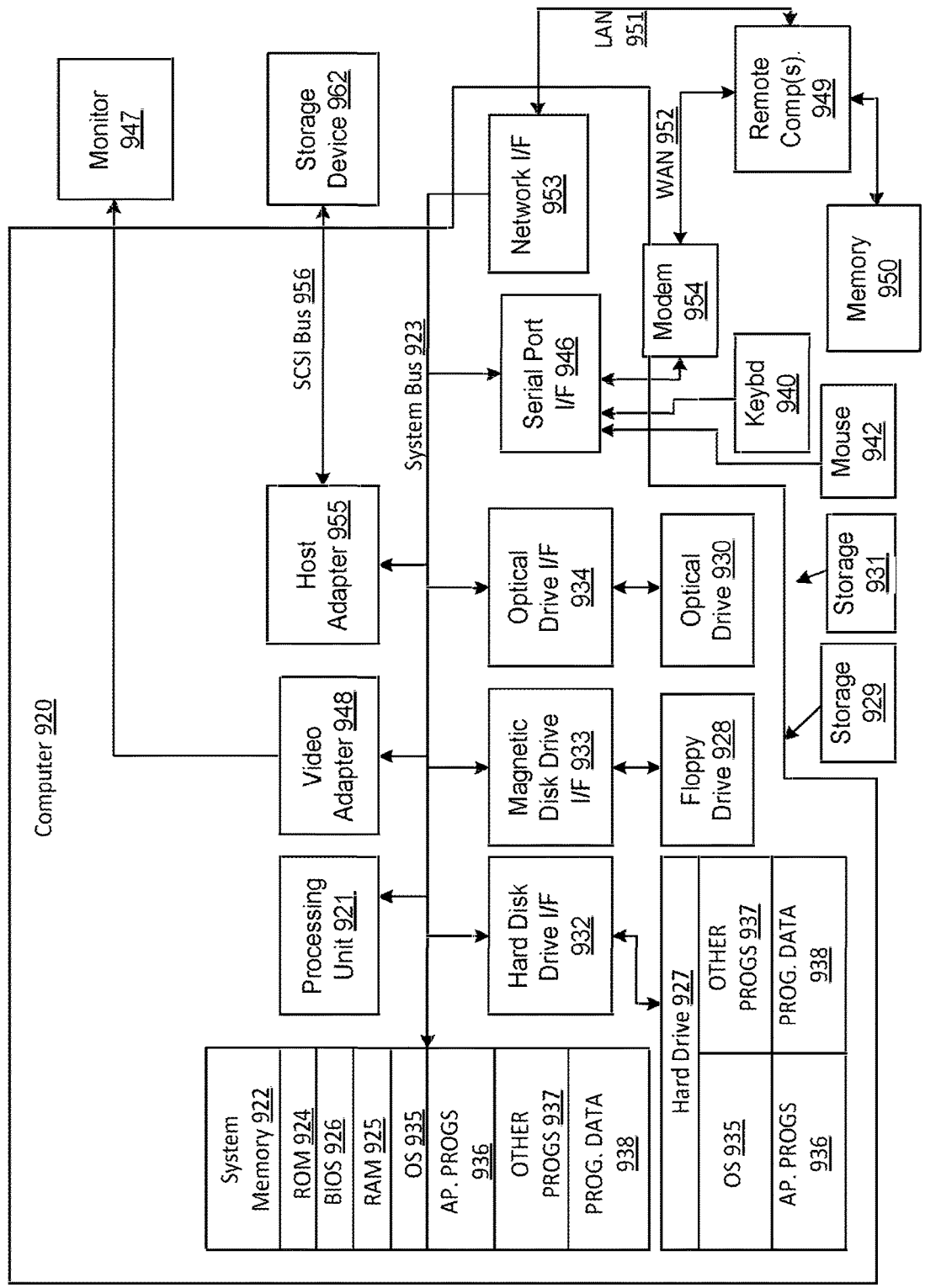
FIG. 16 is an exemplary block diagram representing a computer system in which aspects of the methods and systems disclosed herein or portions thereof may be incorporated.

With continued reference to FIG. 1, data analysis engine 120, morph engine 130, and sensor management engine 140 are logical entities that may be implemented in the form of software (e.g., computer-executable instructions) stored in a memory of, and executing on a processor of unmanned vehicle 100, server 149, or another computer system such as illustrated in FIG. 16. Data analysis engine 120 may analyze data retrieved by sensor 145. Analysis by data analysis engine 120 may include comparing image data to identify types of vehicles/structures, severity of damage, visibility, weather, or the like. Morph engine 130 may be utilized to determine how to alter the shape of unmanned vehicle 100, which may include changing the shape of wings or rotors. Morph engine 130 may also determine modifications to a vulnerable or critical part of unmanned vehicle 100 based on gathered data. For example, unmanned vehicle 100 because of its morphing ability may be directed to prematurely morph before arriving to an area that would likely damage (e.g., smoke damage or scratching) or otherwise compromise a sensor sensitive to those conditions. Premature morphing may include exposing a polymorphic material to a threshold activating condition (e.g., minimum threshold temperature of 90 degrees Fahrenheit) that alters shape to protect the sensor (or other part) before arriving directly to an area with an intense condition (e.g., very high temperature), because there may be a time lag between the activating condition and actual morphing. Polymorphic and the like materials are discussed in more detail herein.

Sensor management engine 140 controls sensor 145. This control may include determining which sensor of a plurality of sensors are gathering data/information, the operating characteristics of said data gathering (e.g., the level of zoom of a visible light camera), where sensor 145 is aimed, or any other sensor performance control variables as would be recognized by those skilled in the art. It is contemplated herein that sensor 145 may include a visible light camera, an infrared camera, a microphone, a particle inspection device (e.g., a device that can detect what compounds are in sampled air gathered by unmanned vehicle 100), radar emitting/detecting device(s), a spectrometer, a hyperspectral sensor, a temperature sensor, a humidity sensor, a gas sensor, or a navigation sensor, among other things.

Discussed herein is the ability of unmanned vehicle 100 to break out into sub-drones based on detection of threshold conditions (also referred to as "conditions" herein). Example conditions include damage-related conditions for unmanned vehicle 100 and spatial conditions, among others. The sub-drones may regroup into a larger unit automatically based on detection of threshold conditions. Unmanned vehicle 100 may change shape using a programmable polymer body based on detection of threshold conditions. Magnets, latches, servos, etc., may be configured to accomplish the unmanned vehicle morphing procedures discussed herein. With reference to FIG. 1, for example, when unmanned vehicle 100 is surveying a property, there may be conditions in or outside of a building on the property that may be too small to access by the unmanned vehicle based on the current construction unmanned vehicle or damage the unmanned vehicle.

Figure 2:
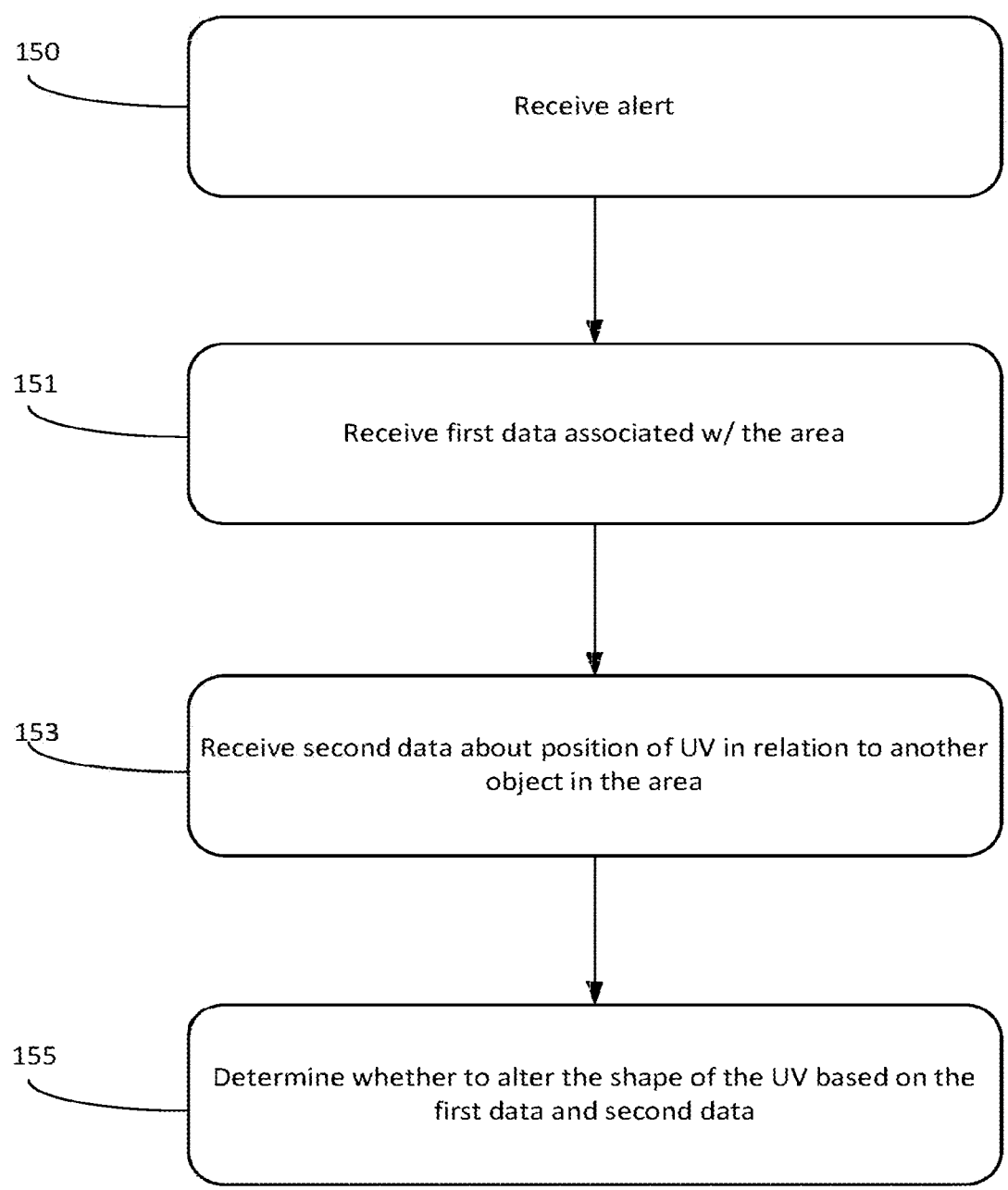
FIG. 2 illustrates an exemplary method to morph an unmanned vehicle.

FIG. 2 illustrates an exemplary method to morph an unmanned vehicle. At step 150, a device, such as server 149 or unmanned vehicle 100, may receive an alert about a location (e.g., area 147). The alert may be based on damage to a structure (e.g., structure 131). Structure 131 may be a commercial building, smart home, or the like. At step 151, unmanned vehicle 100 may receive first data that is associated with area 147. The first data received may include position of buildings, signs 146, vehicles, trees 148, rivers, or other structures at area 147. The position of structures may be based on a geographic information system. In addition, the first data may include building plans (e.g., position of windows, doors, hallways, columns, etc.). The first data may also include other information about area 147, such as weather and an alert of an emergency and type of emergency (e.g., house fire). The alert of step 150 and the first data of step 151 may help determine what unmanned vehicle to deploy to area 147. Considerations with regard to deployment may include whether the unmanned vehicle can detect humans. This detection may be done via thermal imaging and other image analysis by one or more sensors.

With continued reference to FIG. 2, at step 153, second data may be received associated with the position of unmanned vehicle 100 in relation to another object in area 147. The second data may be from sensors located on or otherwise approximate to (e.g., integrated into structure 131) unmanned vehicle 100. The second data may be received in real-time. Unmanned vehicle 100 may use the second data to easily confirm the identity of structures in area 147 and provide updated information for subsequent deployments of unmanned vehicles. At step 155, unmanned vehicle 100 determines whether to alter the shape (e.g., morph) of unmanned vehicle 100 based on the first data and the second data. As discussed herein, altering the shape of unmanned vehicle 100 may include telescoping/folding wings, blades, or other parts, detaching parts (e.g., nestable and mothership configurations discussed herein), or a shape change based on a programmable polymer getting to a threshold condition. In an example, unmanned vehicle 100 may be a fixed winged craft (fixed to a side of a central body) with telescoping wings (or folding wings). Fixed-wing unmanned vehicles may retract or extend at a joint between the wing and the body. In a scenario, where a wing of unmanned vehicle 100 telescoped/extended position and may hit the side of a building in that position, it may determine to withdraw the subject wing until the obstacle has passed. The unmanned vehicle may take into consideration first data and second data within the context of such things as the following: whether a door is positioned in the flight path along the structure may be opened, whether unmanned vehicle 100 will maintain a satisfactory speed or flight pattern, or the like.

Unmanned vehicle 100 may change form based on spatial reasons. For instance, unmanned vehicle 100 may attempt to inspect a region that is difficult to reach with its current form. Unmanned vehicle 100 may sense spatial constriction in an indoor space (e.g., structure 131) via different mechanisms, such as detecting an increased reliance on optical flow stabilization algorithms due to increased turbulence from its propellers, which with other information (e.g., GPS) may be indicative of being in an enclosed space. Unmanned vehicle 100 may change its size or shape by retracting or expanding its propeller blades, for example. In an example, this can be achieved by telescoping propeller blades, which may be spring loaded for extension and use electromagnets for retraction. In another example, change of size or shape may be a folding of blades. Blades may be folded by combination of servos and hinges to allow the extended portion of each blade to flip back or inward. A magnetized ventral side of the blade can allow a bent flap to latch firmly for stable flight.

Figure 3A:
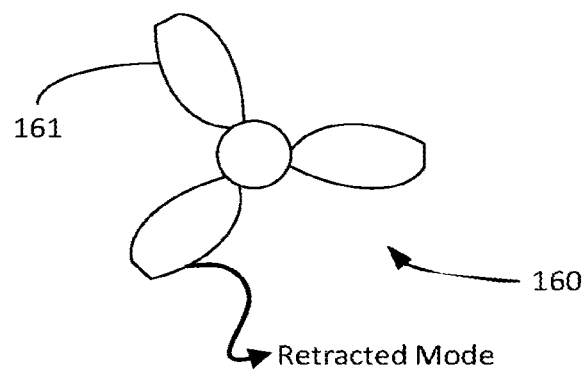
FIG. 3A illustrates an exemplary top view of a quadcopter propeller that may be located on an unmanned vehicle.
Figure 3B:
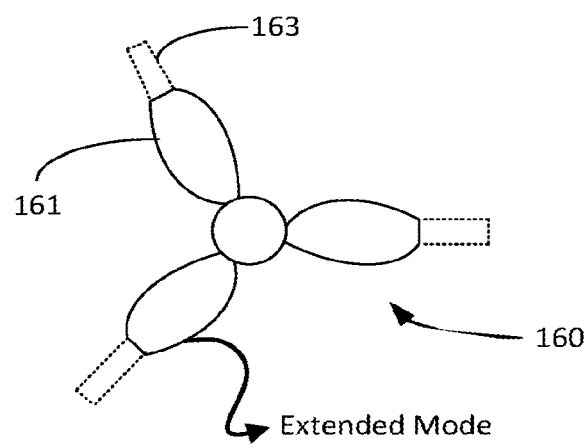
FIG. 3B illustrates an exemplary top view of a quadcopter propeller with an extended blade.
Figure 3C:
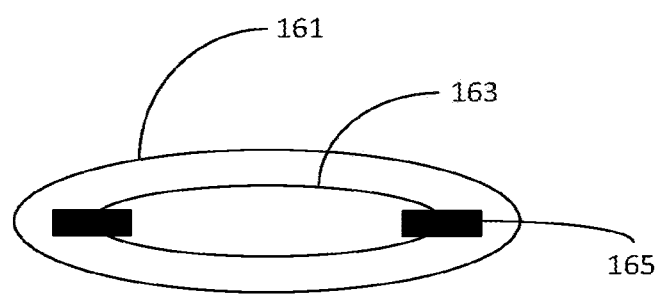
FIG. 3C illustrates an exemplary cross-sectional view of a blade, an extended blade, and electromagnetic latches.

FIG. 3A illustrates an exemplary top view of blade 161 of quadcopter propeller 160 that may be located on unmanned vehicle 100. FIG. 3B illustrates an exemplary top view of extended blade 163 of quadcopter propeller 160 that may be located on unmanned vehicle 100. FIG. 3C illustrates an exemplary cross-sectional view of blade 161, extended blade 163, and electromagnetic latches 165. Electromagnetic latches 165 may flip to release extendable blade 163. Extended blade 163 may extend beyond the length of blade 161 or retract entirely or partially within blade 161. A spring loaded mechanism may be used to assist in the extension of extended blade 163 and an induction coil mechanism may be used for the retraction of extended blade 163.

FIG. 4A illustrates an exemplary side view of a folding propeller blade 170. Blade portion 171 of folding propeller blade 170 is connected with extended blade 175 by hinge 173. Blade portion 171 may have a magnetized ventral side 172. FIG. 4B illustrates an example of extended blade 175 folded and connected with magnetized ventral side 172 of blade portion 171. In example, hinge 173 may have solenoid coils to snap and release extended blade 175. Extended blade 175 instead of blade portion 171 may have a magnetized strip to hold extended blade 175 in a retracted position.

Unmanned vehicle 100 may change form based on conditions that may affect damage on unmanned vehicle 100 or a nearby structure. Conditions may include a threshold amount of moisture, smoke (e.g., carbon monoxide, hydrogen cyanide, and other combustion products), temperature, or even time-of-day, among other things. The presence of a condition at a certain threshold level may trigger unmanned vehicle 100 to change shape in order to protect hardware. For each condition mentioned herein, it is assumed that unmanned vehicle 100 or device approximate to unmanned vehicle 100 is equipped with the corresponding sensor such as a moisture sensor, temperature sensor, infrared sensor, etc. As discussed herein, unmanned vehicle 100 may change form based on the time of day. In an example, during the night, unmanned vehicle 100 may operate in quiet mode, which may require a certain amount of retraction or expansion of propeller wings of unmanned vehicle 100.

In another example, unmanned vehicle 100 (e.g., propeller-based) may change from a two-propeller mode on each copter to a three-propeller mode. That is, unmanned vehicle 100 may add (extend) or delete (retract) a propeller based on some circumstances or conditions. In general, the three propeller mode may provide a smoother and stable ride but consume more power. Unmanned vehicle may makes these decisions based on its power needs and environmental conditions.

Unmanned vehicle 100 may rely on electronic hardware that is run more efficiently when heat is dissipated from it. There may be several air vents in the hardware enclosure. In an example, unmanned vehicle 100 may have hardware mounts that are left open to allow for quick addition of modular components. It may be advantageous to protect vents and openings of unmanned vehicle 100 from moisture, heat, smoke, or the like. Unmanned vehicle 100 may be configured with specific "programmable" polymers (hereinafter polymers) that change form given a specific condition (e.g., 4D printing technology). In an example, polymer based latches can change shape, given a certain environmental condition, such as heat or moisture, to release a protective sheath, which may then provide a protective layer and stay fixed during flight with magnetized receptors. In another example, the cover of the unmanned vehicle could have polymer layers that can harden based on environmental conditions. The polymer may be embedded in the structure of unmanned vehicle 100 or may be a selectively attachable or detachable component added at a rested (non-activated state) that may be added based on the deployment reason. Subsequently conditions may activate the selectively attachable or detachable component to take a shape that protects unmanned vehicle 100 from damage. The selectively attachable or detachable component may be advantageous in situations when the morphing of the polymer is not easily reversible.

Figure 5A:
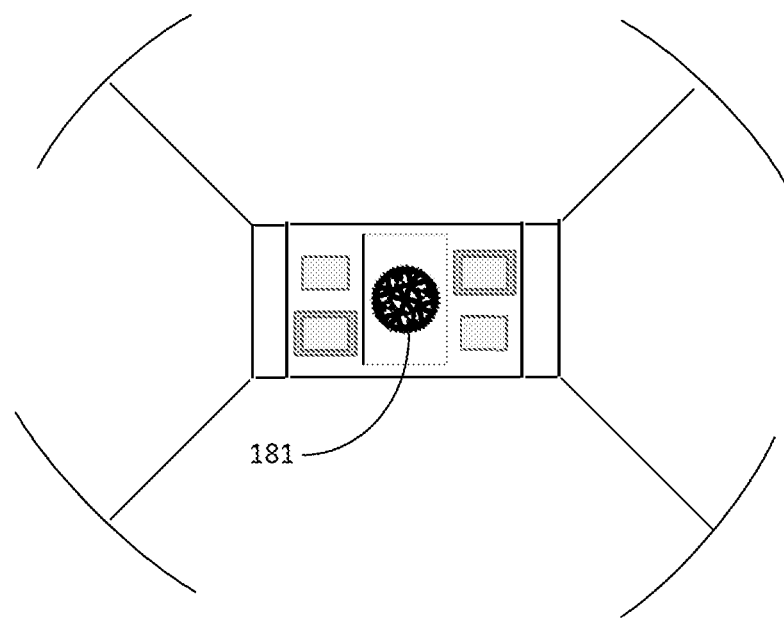
FIG. 5A illustrates an exemplary unmanned vehicle with a vulnerable ventral section.
Figure 5B:
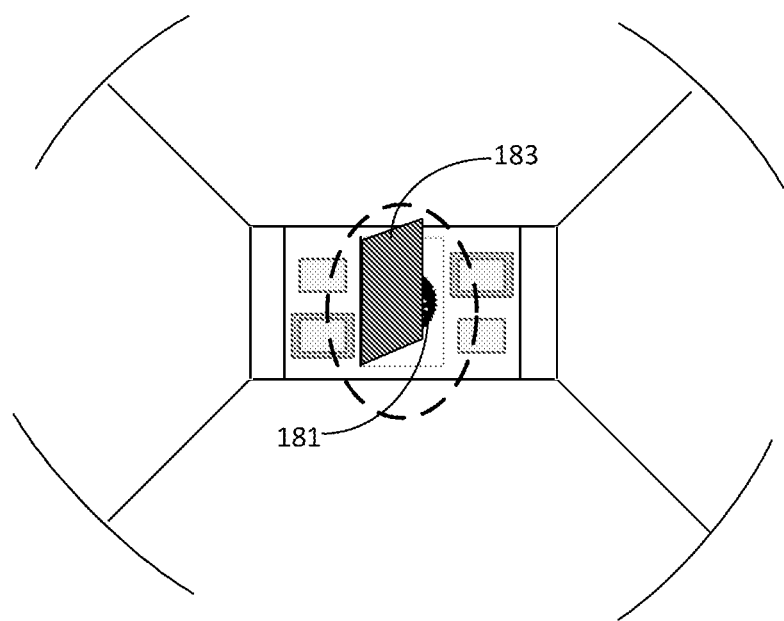
FIG. 5B illustrates a sheath over a ventral section.
Figure 6C:
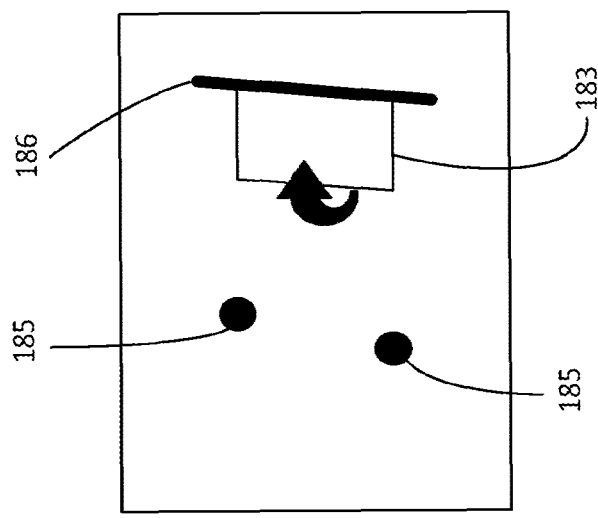
FIG. 6C illustrate an example use of polymers to protect an unmanned vehicle from damage.
Figure 6B:
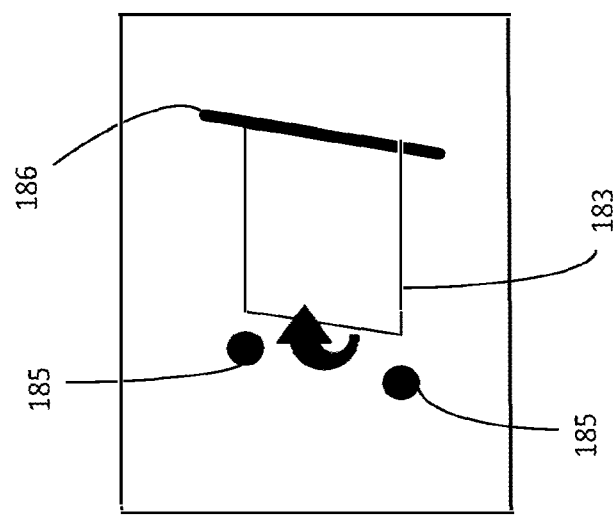
FIG. 6B illustrate an example use of polymers to protect an unmanned vehicle from damage.
Figure 6A:
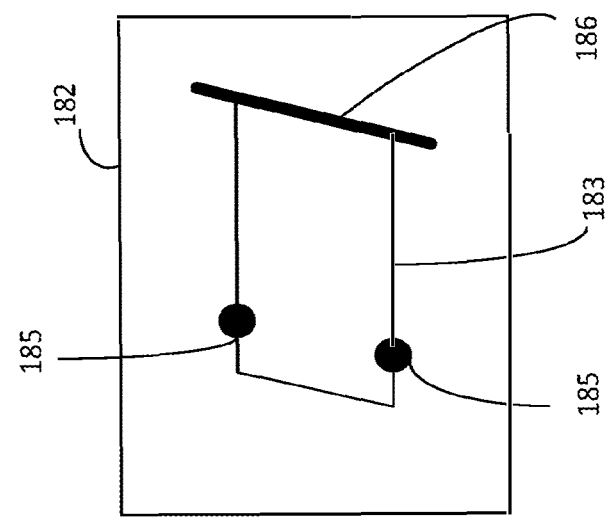
FIG. 6A illustrate an example use of polymers to protect an unmanned vehicle from damage.

FIG. 5A illustrates an exemplary unmanned vehicle 100 with vulnerable ventral section 181. FIG. 5B illustrates sheath 183 over ventral section 181. Sheath 183 may be a sheath capable of insulation that is released by a 4D printed polymer based on an environmental condition. FIG. 6A through FIG. 6C illustrate an example use of polymers to protect unmanned vehicle 100 from damage. Sheath 183 may be inside the bottom body 182 of unmanned vehicle 100. Polymer latches 185 may hold sheath 183 within unmanned vehicle 100. Based on an environment condition, polymer latches 185 may release sheath 183 and allow it to move through opening 186. Subsequently, as shown in FIG. 5B, sheath 183 may be on the outside of unmanned vehicle 100. When sheath 183 is released, there may be may be magnetized receptors on the outside receiving surface to hold sheath 183 in place. It is contemplated herein that there may be a plurality of polymorphic materials that may be housed on unmanned vehicle 100, but may only use some of the polymorphic material per situation. For example, unmanned vehicle 100 may have ten sheaths 183 that may be used in the manner discussed herein. A first sheath 183 may be detached automatically after a time period or condition passes (e.g., smoke). A second sheath 183 may be engaged after the environment condition occurs. Second sheath 183 may be detached automatically after a time period or condition passes (e.g., smoke). This scenario may apply to the other scenarios discussed throughout (e.g., associated with FIG. 1-FIG. 15).

FIG. 7A and FIG. 7B illustrate an exemplary telescopic arm. The retractable/telescopic arms with expand or contract to fit in spaces. The arm may be controlled by a servo motor and link arm that pushes/pulls the arm to its designated position. The motors may have a corresponding change in speed to counteract the change in distance that is calculated in real time. This can make movement in varying conditions more efficient. FIG. 7A, FIG. 7B, FIG. 8A, and FIG. 8B, and the like are a quadcopter but may be representative of any type of multi-arm based UV. In another example, telescopic/retractable functions (or other functions—bending, etc.) may be based on the use of polymers that may expand or retract based on conditions. For example, a polymer may expand or retract based on a temperature condition as the trigger. After detecting a condition, unmanned vehicle 100 may induce the temperature trigger (threshold) to cause the telescopic/retractable functions or the like as discussed herein. Unmanned vehicle 100 may induce the temperature trigger by electric powered heating element, redirecting heat already generated by use of unmanned vehicle 100 (e.g., redirect combustion or battery heat), or turning off or on a cooling system, among other things. The temperature trigger may be incorporated into just a latch or hinge (e.g., hinge 173) which uses the polymer that reacts to temperature. It is contemplated that this example regarding polymers may apply to other examples herein such as FIG. 3-FIG. 13.

Figure 8A:
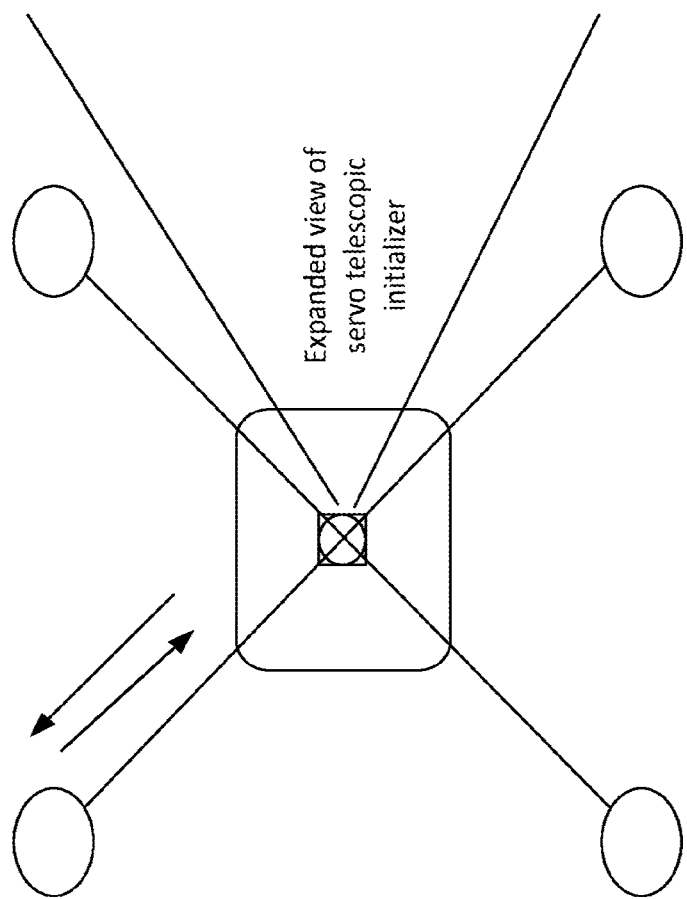
FIG. 8A illustrates an exemplary telescopic arm with a servo morphing.
Figure 8B:
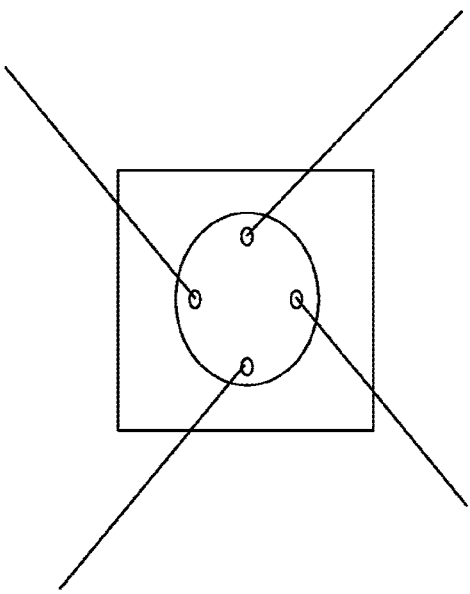
FIG. 8B illustrates an exemplary telescopic arm with a servo morphing.

FIG. 8A and FIG. 8B illustrate an exemplary telescopic arm that may use a servo. The polymorphic retractable/telescopic arm (servo) is another variation of the telescopic arm retraction system that uses one servo (instead of 4) to pull/push all the arms in one motion to either expand or contract. The motors will also change speed in real-time to counteract effects of a change in distance of the arm and to positively affect efficiency.

Figure 9A:
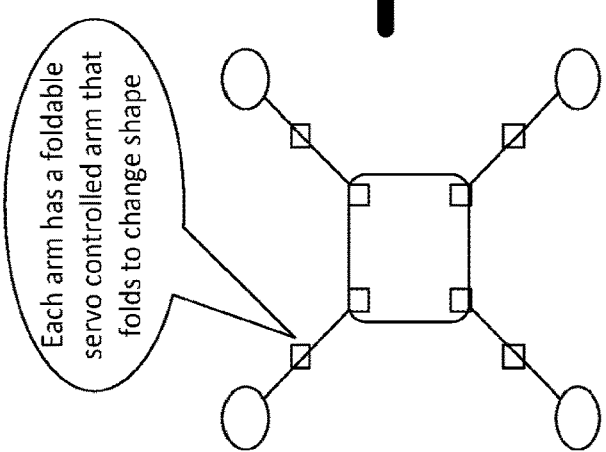
FIG. 9A illustrates a bendable arm into a vertical canister morphing.
Figure 9B:
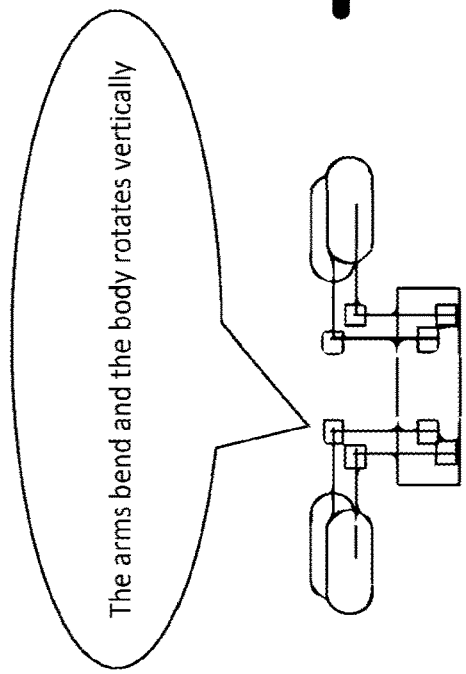
FIG. 9B illustrates a bendable arm into a vertical canister morphing.
Figure 9C:
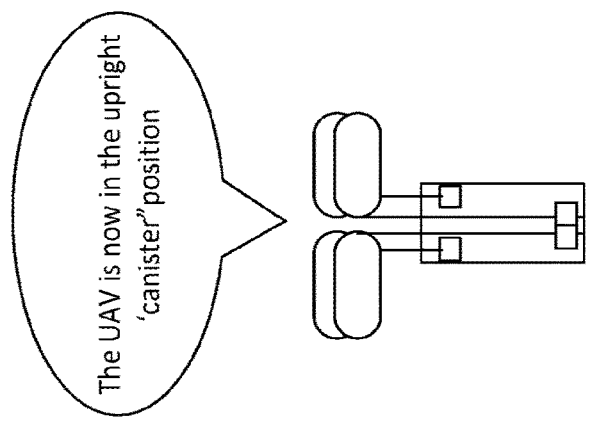
FIG. 9C illustrates a bendable arm into a vertical canister morphing.

FIG. 9A through FIG. 9C illustrate a bendable arm into a vertical canister. The bendable arm into vertical canister version of a morphing UAV may have a plurality of servos (e.g., 8 separate servos) that bend the arm from straight to bent, in order to, prop the UAV in an upright 'canister-like' position. This may allow the greatest change in shape to maximize its spatial availability. Each motor may be controlled in real time to change its speed to counteract any changes in distance and to maximize efficiency. The UV is capable of flight throughout its morphing states by assessing in real time the changes necessary to maintain stable flight.

An unmanned vehicle 100 may morph for security reasons. Unmanned vehicle 100 may separate into multiple unmanned vehicles in order to pursue multiple intruders.

Figure 10:
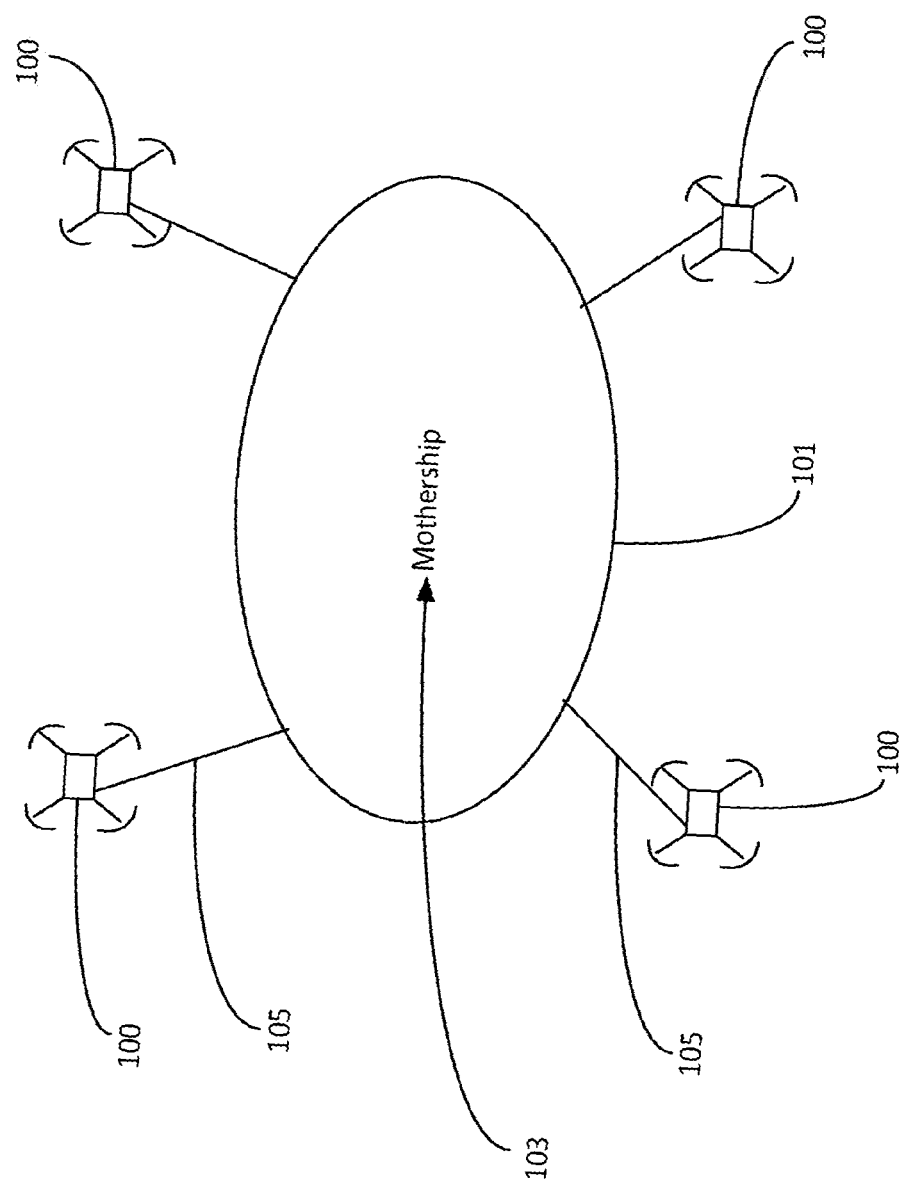
FIG. 10 illustrates an exemplary top view of a mothership connected with a plurality of unmanned vehicles morphing.

FIG. 10 illustrates an exemplary top view of a mothership connected with a plurality of unmanned vehicles 100. Unmanned vehicles 100 may "nest" by connecting together via a central control module titled "mothership" 101 that provides power, control, positioning, or data storage. Mothership 101 may be a thin flat device with a large surface area (e.g., 4 ft.×4 ft.). Top surface 103 may comprise solar panels that recharge the internal battery array of mothership 101 when deployed. Multiple (e.g., 4) unmanned vehicles 100 may connect via arms 105 that extend from mothership 101. In an example, when deployed, unmanned vehicles 100 may carry mothership 101 to a designated area and then deploy it on the ground and detach to independently scan the surrounding area (e.g., FIG. 11). Detachment/attachment may be based on polymer as discussed herein (e.g., FIG. 7A and FIG. 7B). Unmanned vehicles 100 may return when finished scanning the area, for recharging a low battery, or the like. The use of mothership 101 allows for the storage of data that unmanned vehicles 100 scan, the storage of extra battery power, and the ability of unmanned area vehicles to recharge and travel farther distances. A device (such as server 149, mothership 101, or unmanned vehicle 100) may determine the most efficient location (e.g. area 147) to deploy mothership 101. Efficiency may be based on the ability of mothership 101 to recharge (e.g., whether enough sunlight) or the ability of unmanned vehicles 100 to efficiently scan area 147 or other adjacent areas and return to mothership 101.

Figure 11:
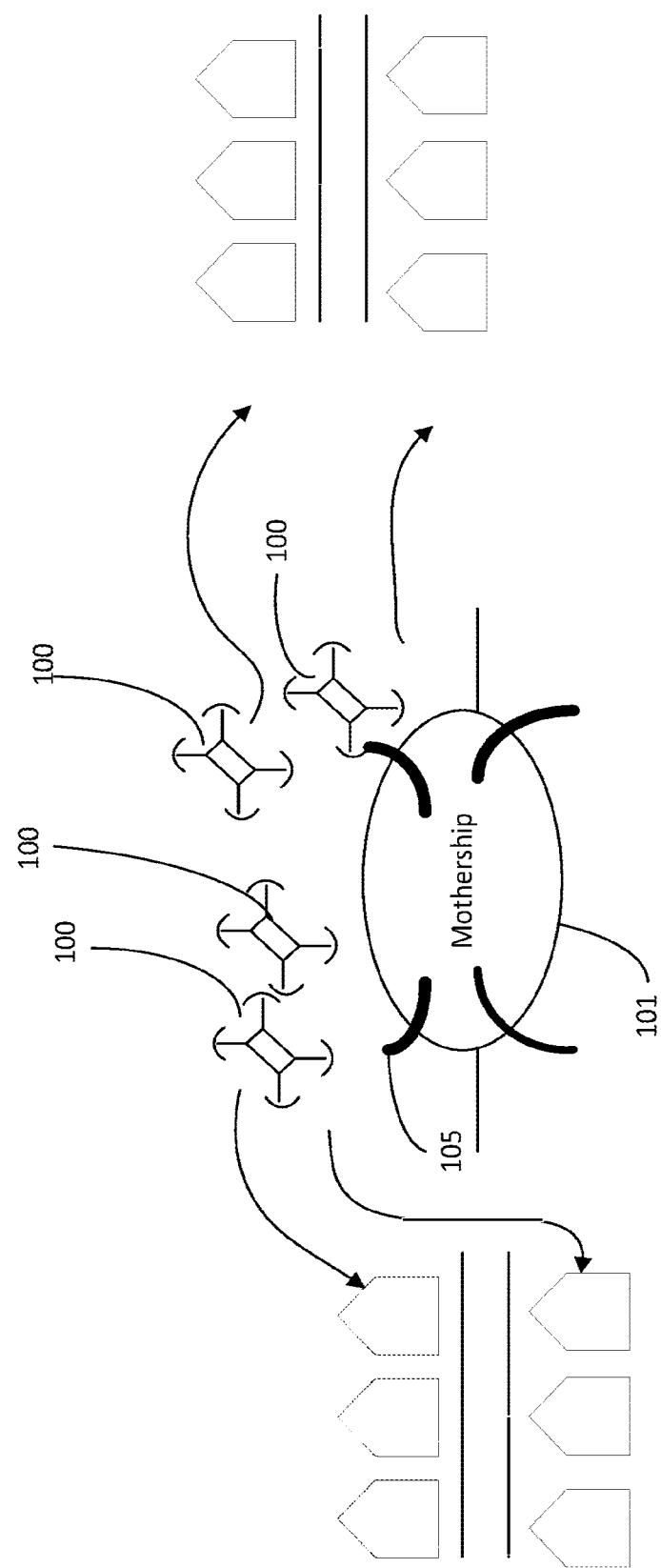
FIG. 11 illustrates mothership landing and an unmanned vehicles detaching.

FIG. 11 illustrates mothership 101 landing and unmanned vehicles 100 detaching. Each unmanned vehicle 101 may depart to a separate subsection to scan. Collectively unmanned vehicles 100 may scan until the desired area is covered. If unmanned vehicle 100 runs low on battery, it may return to mothership 101, connect and recharge. Unmanned vehicle 100, after recharging, may depart and continue where it left off. Mothership 101 may recharge its battery bank via solar panels and mange distribution of the area to each unmanned vehicle 100. Each unmanned vehicle 100 knows its location relative to the position of mothership 101. As the unmanned vehicle 100 scans it may wirelessly transmit data back to mothership 101, which may include location data (e.g., GPS data). Mothership 101 may be transported via truck to the vicinity in which scans are to be taken. Upon arrival mothership 101 may depart and with the use of unmanned vehicles 100 begin its consecutive scans of the various surrounding areas. Once scans are complete mothership 101 and attached unmanned vehicles 100 may go to a designated area, such as the truck. If a first unmanned vehicle 100 returns to mothership 101 (e.g., to recharge, upload/download data, etc. . . . ) it can alert the other unmanned vehicles 100 in the area, so that other unmanned vehicles 100 can pick up where the first unmanned vehicle 100 left off. Particularly, if it will not be done charging in time to finish.

Figure 12A:
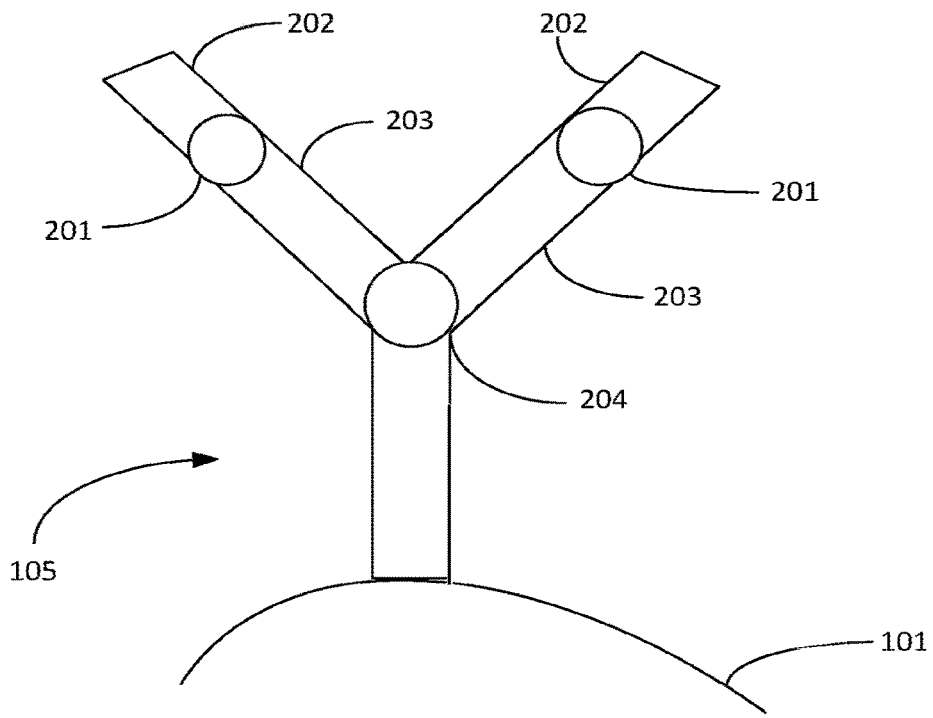
FIG. 12A are exemplary illustrations of an arm that is used to clamp or dock an unmanned vehicle to a mothership.
Figure 12B:
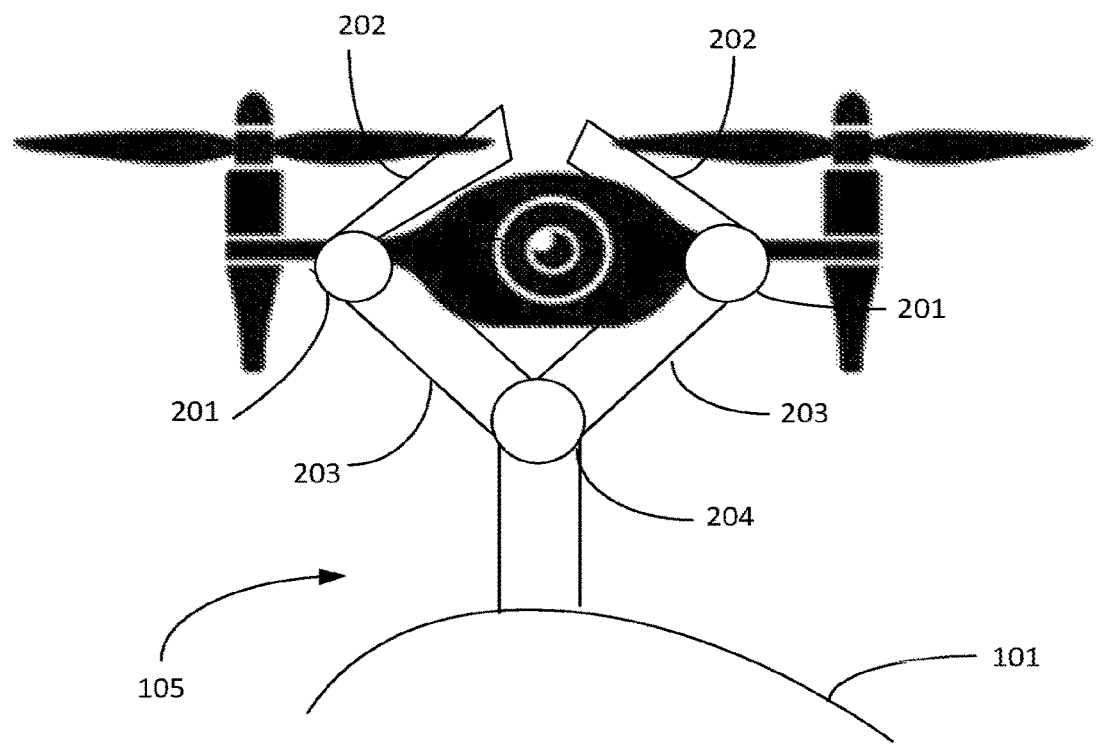
FIG. 12B are exemplary illustrations of an arm that is used to clamp or dock an unmanned vehicle to a mothership.

FIG. 12A and FIG. 12B are exemplary illustrations of arm 105 that are used to clamp or dock unmanned vehicle 100 to mothership 101. Arm 105 will have a y-shaped end mechanism. As shown in FIG. 12A, arm 105 at point 204 splits into a Y-shape. Point 204 may be a hinge. Arm 203 extends from point 204 and connects with extended arm 202 via hinge 201. Arm 203 and arm 202 may be padded. As unmanned vehicle 100 descends in between the pads, a pressure sensor (not shown) at or about point 204 in the crevice of the Y structure detects the descent and once a certain threshold is reached, the hinged portions (hinges 201) fold towards unmanned vehicle 100. The resulting state of arm 105 is the shape of a diamond with the body of unmanned vehicle 100 resting in the middle. In an exemplary configuration, as shown in FIG. 12B, the propeller blades of unmanned vehicle 100 drop to a height of the dock (arm 105) and hinges 201 are separated from each other by the width of unmanned vehicle 100. Unmanned vehicle 100 may be outfitted with ports at the bottom for power and data connections. Unmanned vehicle 100 may automatically connect with appropriate ports of arm 105 when it docks. There also may be other configurations with wireless charging and wireless data communications between mothership 101 and unmanned vehicle 100.

Figure 13:
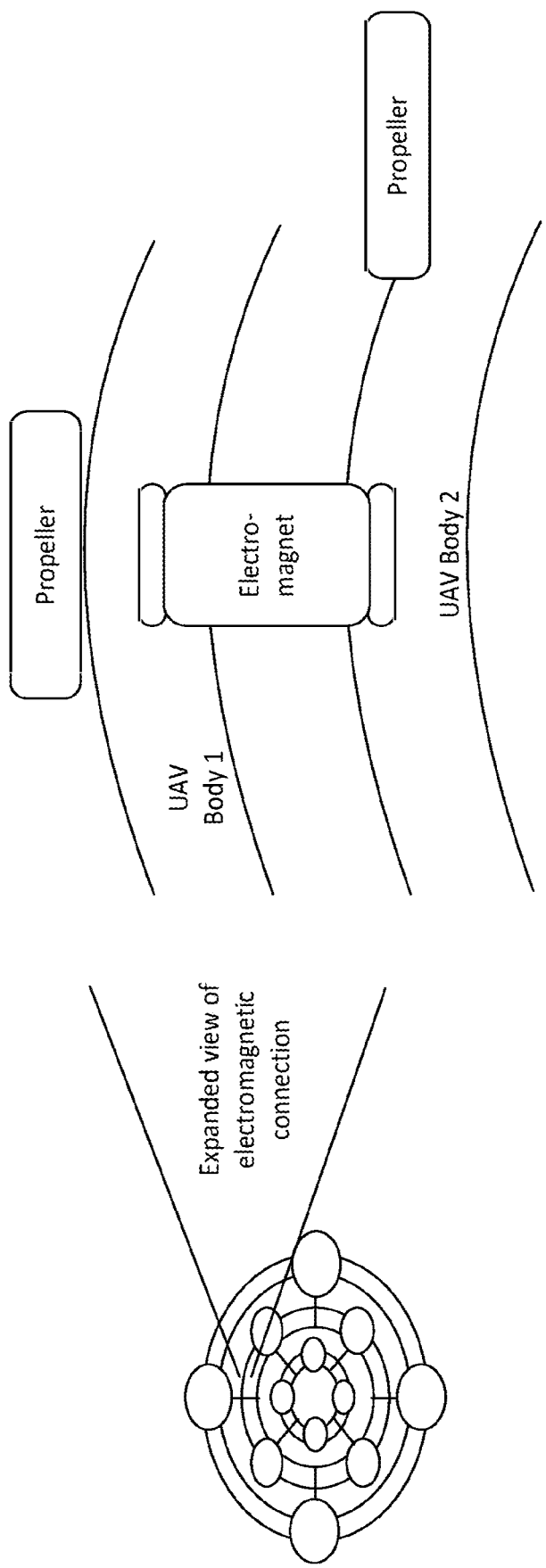
FIG. 13 illustrates exemplary morphing of nestable circular unmanned aerial vehicle with electromagnetic connections.

FIG. 13 illustrates an exemplary nestable circular unmanned aerial vehicle with electromagnetic connections. Unmanned vehicles can be bulky or cumbersome and having more than one can take up more room than intended and be difficult to transport. Nestable unmanned vehicles systems are a way for multiple unmanned vehicles 100 to connect together or detach from a central location. This integration could be used in security purposes where multiple unmanned vehicles 100 are activated and detach or reconnect from a central location to patrol a location. The nestable circular unmanned vehicle 100 uses electromagnetic connections to attach/detach smaller/larger unmanned vehicles 100 within its concentric circular structure. This allows multiple unmanned vehicles 100 to work together either connected or disconnected to accomplish a set of instructions. Each unmanned vehicle 100 can communicate with each other to maximize efficiency while accomplishing the task. Each unmanned vehicle 100 may communicate with the other to determine the order to nest or detach. The circular portions can be considered propellers.

Figure 14:
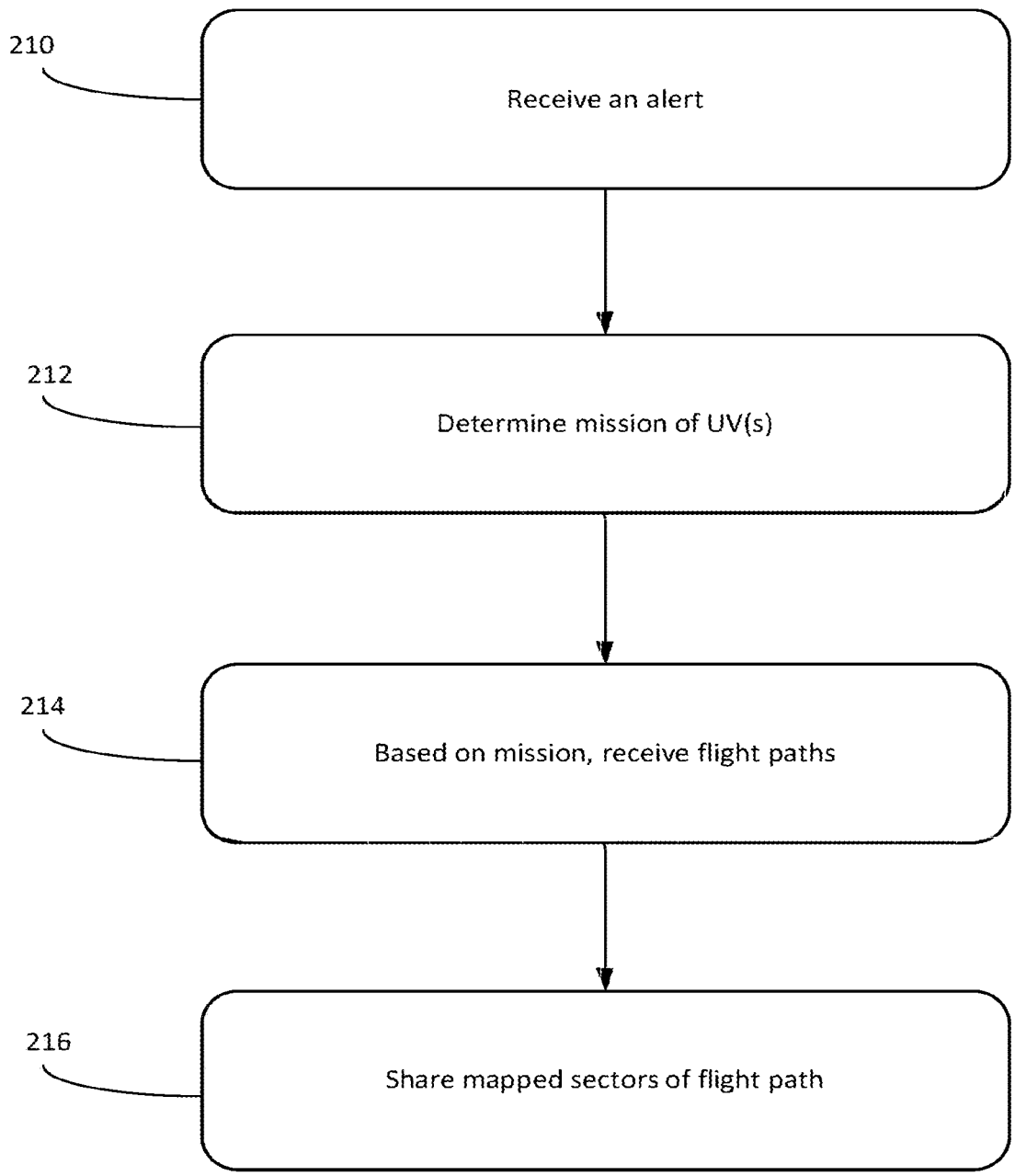
FIG. 14 illustrates an exemplary method for a shared distributed flight path.

FIG. 14 illustrates an exemplary method for a shared distributed flight path. At step 210, an alert is received. The alert may be based on damage to structure 131. At step 212, which may be responsive to the alert of step 210, a mission is determined. A mission may be considered a plan of action for unmanned vehicle 100. The mission may be determined after taking several things into account, such as type of property or unmanned vehicle 100, type of damage, time, date, location of property or unmanned vehicle 100, weather, bodily injury, or service plan (e.g., insurance related) associated with property, among other things. In an example, the mission may be to survey structure 131 for damage. Structure 131 may be a warehouse that may expand several thousands of square feet and may need multiple unmanned vehicles (e.g., three unmanned vehicles 100) with certain sensor capabilities, battery life, polymorphic attributes, etc. At step 214, based on the mission, unmanned vehicles 100 receive flight paths or the like data. The flight path of step 214 may provide instructions for unmanned vehicles 100 to be nested for a certain percentage of the flight to structure 131 and disperse when a particular location is reached. Unmanned vehicles 100 may be assigned particular areas or sectors of structure 131 to survey, which may be based on sensors or the like of the unmanned vehicle 100. At step 216, unmanned vehicles 100 may share mapped sectors associated with individually assigned flight paths. The system would store the environment data that each unmanned vehicle 100 creates as it learns the environment around it and shares that information to any connected unmanned vehicle 100. Any connected unmanned vehicle 100 could use this shared repository to learn the entire environment of a sector without having to be the specific unmanned vehicle 100 for that sector. In an example, this may be useful if a first unmanned vehicle 100 assigned to a sector discovers an anomaly that it cannot interpret with its current sensors so a second unmanned vehicle 100 in structure 131 may be requested. The second unmanned vehicle 100 may receive a mapping of the sector from the first unmanned vehicle 100, which may reduce the amount of processing needed to travel to or within the sector. The second unmanned vehicle 100 may use the information from the first unmanned vehicle 100 (and other approximate unmanned vehicles 100) to travel straight to the anomaly and use the appropriate sensors.

Figure 15:
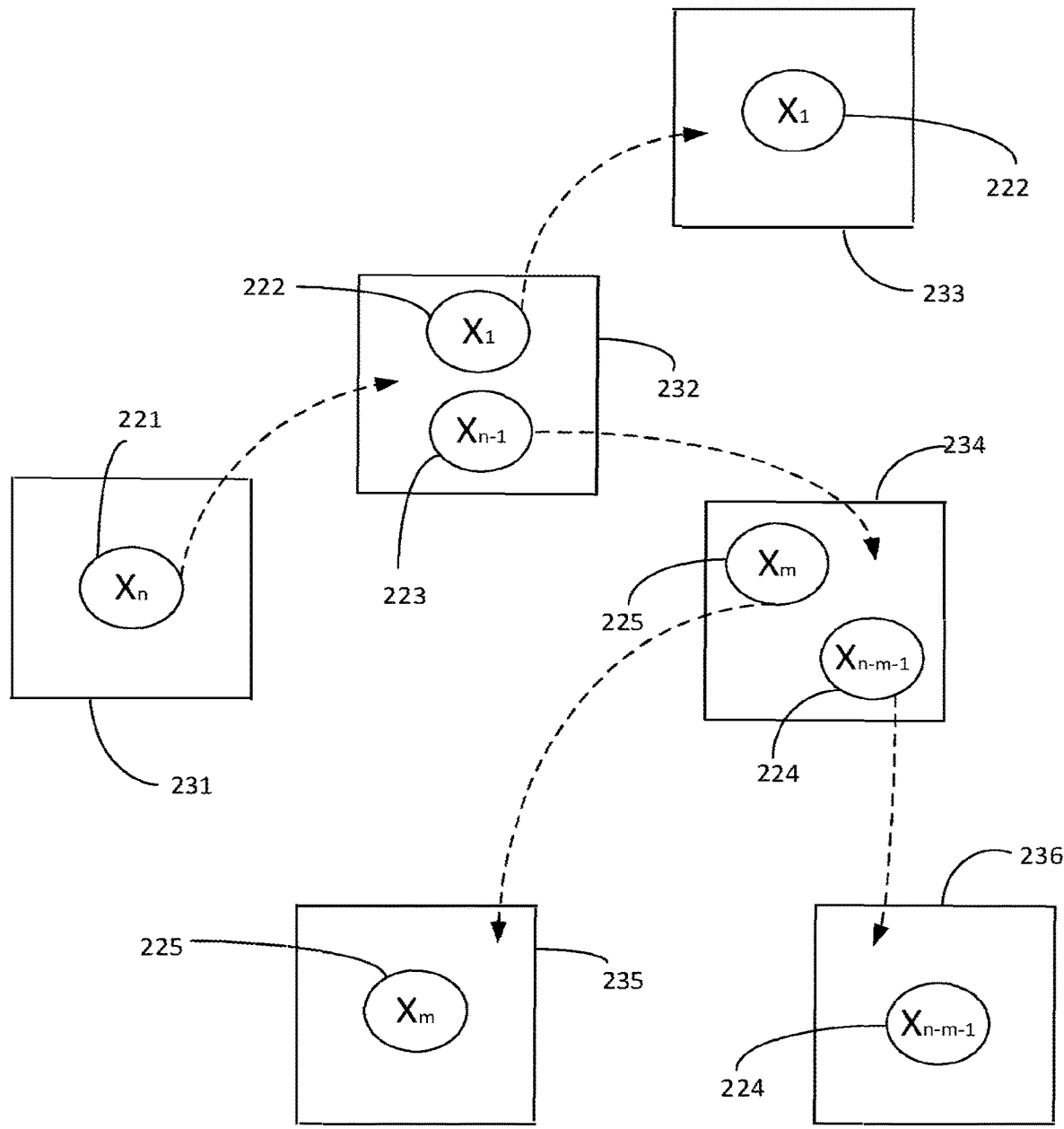
FIG. 15 illustrates a shared flight path example that may use one or more steps of the method of FIG. 14.

FIG. 15 illustrates an example that may use one or more steps of the method of FIG. 14. Unmanned vehicle 221 is in sector 231 and is composed of a plurality of nested unmanned vehicles (e.g., FIG. 13 or FIG. 10). Step 210, step 212, and step 214 may have already been completed. Based on a received flight path, unmanned vehicle 221 travels to sector 232 and splits into unmanned vehicle 222 and unmanned vehicle 223. Unmanned vehicle 222 travels to its assigned sector 233 and maps sector 233. Unmanned vehicle 223 travels to (and may map) its assigned sector 234 (e.g., based on the flight path) and splits into unmanned vehicle 225 and unmanned vehicle 224. Unmanned vehicle 225 travels to its assigned sector 235 and maps sector 235. Unmanned vehicle 224 travels to its assigned sector 236 and maps sector 236. The mapped sectors may be shared as needed to reduce duplication of effort and make the execution of the assigned mission more efficient.

Unmanned vehicle 100 may share flight patterns between other unmanned vehicles for enhanced rendering capabilities. Each unmanned vehicle 100 learns the environment around it using any number of available sensors and shares that information with a connected unmanned vehicle 100 directly or through a shared server 150. Three dimensional proximity sensors may be incorporated within the unmanned vehicle 100 for environmental mapping, to the storage and retrieval systems for the shared server 150, as well as the environmental maps themselves that could displayed in 2D, 3D, holographic (Augmented Reality), and Virtual Reality and change/modify flight patterns or simply work on a service (e.g., claims processing) without having to enter the premise. The disclosed subject matter may allow business (e.g., insurance providers or the like) to better serve its members. Using three dimensional proximity sensors, for example, a skier may have unmanned vehicle 100 fly ahead of him and detect the path with the least amount of obstacles. This information may be sent back to a skier's watch, skis, helmet, or headphones. For example, the skier could have a smart watch that provides directions (e.g., voice or text directions) to the skier of which path to take. The skier's watch could vibrate a specified number of times to indicate which path to take. The skier's skis could turn a specified color or vibrate each individual ski pole to indicate direction or both ski poles to indicate forward or a constant vibration to indicate that the skier should stop skiing, for example. The skier could receive heads up display instructions on the helmet. The skier could hear the information from unmanned vehicle 100 through his headphones.

Herein are several different examples associated with morphing unmanned vehicles. It is contemplated herein that methods, components, or the like of each example may be reasonably integrated with or removed from other examples discussed herein. Additional examples are discussed below.

In another example, tiers of data are collected, such as, for exemplary purposes only and without limitation, visual light image data, hyperspectral image data, infrared data. Said tiers may be handled, distributed, or analyzed alone or in combination.

In yet another example, data gathered by unmanned vehicle 100 may be compared or utilized in coordination with data gathered from other sources. For example, data may be utilized that is gathered from a "smart building" (a building, residential, commercial or industrial), such as via one or more sensors deployed on or near the smart building.

In another example, unmanned vehicle 100 may be equipped with a surplus of sensors 145, of which only some may be utilized on a given mission. In another example, unmanned vehicle 100 is dynamically equipped with sensors 145 based on the parameters of the mission. In another embodiment or use case, the types of sensors 145 selected are determined at least partially based on the type of event that has occurred (e.g., if the event is a flood from a river, then sensors 145 that gather hyperspectral imagery may not be included on unmanned vehicle 100).

In another example, data is streamed via LTE, Wi-Fi, or any networking means as would be recognized by those skilled in the art. In another example, data is streamed via one or more unmanned vehicles 100 communicating or relaying information to a communication station for one another.

In another example, a plurality of unmanned vehicles 100 may be assigned to a single airspace that is related to or is over the site of an event such as a widespread disaster.

In another example, a plurality of unmanned vehicles 100 are assigned to a plurality of airspaces that may be assigned, and said airspaces may be exclusive of each other (or they may not be exclusive of each other). It is contemplated herein that airspaces may be exclusive of each other via geographical coordinates (e.g., the x-axis or the y-axis) or via altitude (e.g., the z-axis).

In another example, the engines related to specific flight and safety control of unmanned vehicle 100 may be separate from the engines that analyze the data (e.g., data analysis engine 120, morph engine 130, sensor management engine 140).

In another example, unmanned vehicle 100 may receive a request for data, and unmanned vehicle 100 may alter a flight path to gather the requested data, unmanned vehicle 100 may confirm the gathered data matches the requirements of the request, and then communicate the requested data (such as to the requesting party).

In another example, hyperspectral imagery is taken, utilized, and analyzed to determine information such as what kind of damage was sustained. For example, the engines on unmanned vehicle 100 or engines on server 149 may determine whether water damage was caused by salt water or fresh water. The type of water damage may be utilized to determine if an insurance claim should be characterized as flood or storm damage or the extent of damage, such as damage to carpet, wood flooring, or the like.

In another example, a mission or plurality of missions may be analyzed to determine what sensor(s) 145 should be installed on unmanned vehicle 100 for future missions. Unmanned vehicle 100 may disconnect and reconnect sensors on an as needed basis. For example, sensors may be stored on mothership 101 or in cases and during the location assessment of unmanned vehicle 100, it may automatically connect the needed sensors and instruments to complete the mission.

Conditions as discussed herein for the different exemplary scenarios may include moisture, smoke, temperature, date, time, weather pattern (e.g., rain, snow, sunny, cloudy, windy/ wind speed, etc. . . . ), amount of sunlight, amount of light, amount of space, proximity to an object, location (e.g., GPS), trajectory or speed of an object toward UV, security alert, speed of UV, amount of energy reserves (e.g., battery power or gas), or proximity to other unmanned vehicles, among other things. These conditions may be detected and responded to (e.g., trigger morphing) on unmanned vehicle 100 or may be detected and responded to via server 149. In an example, server 149 may receive an indication of a condition from first unmanned vehicle 100 and proactively send instructions to morph second unmanned vehicle 100 in proximity to first unmanned vehicle 100. In another example, server 149 may receive an indication of a condition from a satellite about expected weather patterns and proactively send instructions to morph unmanned vehicle 100 that is in proximity of the expected weather pattern. In another example, first unmanned vehicle 100 may detect a condition and proactively send instructions for morphing second unmanned vehicle 100 that is in proximity of first unmanned vehicle 100.

The present disclosure is directed to morphing of unmanned vehicles. The present disclosure is not limited in any way to the examples, which can be applicable in various forms, as appreciated by one skilled in the art. Therefore, it is to be understood that any terms, phrases, structural and functional details, disclosed herein are merely a basis for the claims and as a representative for teaching one skilled in the art to variously employ the present disclosure.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof as known to those skilled in the art, and so forth. In addition, the use of the word "or" is generally used inclusively unless otherwise provided herein.

One skilled in the art will appreciate further features and advantages based on the described examples. Accordingly, the disclosure is not to be limited by what has been particularly shown and described, except as indicated by the appended claims. Further, although at least one series of steps are presented as an exemplary method of practicing one or more examples described herein, it will be appreciated by those skilled in the art that the steps identified may be practiced in any order that is practicable, including without limitation the omission of one or more steps.

It is to be appreciated that network 50 depicted in FIG. 1, for example, may include a local area network (LAN), a wide area network (WAN), a personal area network (PAN), or combinations thereof. Such networking environments are commonplace in offices, enterprise-wide computer networks, intranets, and the Internet. For instance, when used in a LAN networking environment, system 90 is connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to system 90, or portions thereof, may be stored in a remote memory storage device such as storage medium. Computing devices may communicate over network 50 through one or more communications links 75 formed between data interfaces. Communication links 75 may comprise either wired or wireless links. It is to be appreciated that the illustrated network connections in the figures (e.g., FIG. 1 or FIG. 16) are exemplary and other ways of establishing a communications link between multiple devices may be used.

FIG. 16 and the following discussion are intended to provide a brief general description of a suitable computing environment in which the methods and systems disclosed herein or portions thereof may be implemented, such as in unmanned vehicle 100. Although not required, the methods and systems disclosed herein is described in the general context of computer-executable instructions, such as program modules, being executed by a computer, such as a client workstation, server, personal computer, or mobile computing device such as a smartphone. Generally, program modules include routines, programs, objects, components, data structures and the like that perform particular tasks or implement particular abstract data types. Moreover, it should be appreciated the methods and systems disclosed herein and/or portions thereof may be practiced with other computer system configurations, including hand-held devices, multi-processor systems, microprocessor-based or programmable consumer electronics, network PCs, minicomputers, mainframe computers and the like. A processor may be implemented on a single-chip, multiple chips or multiple electrical components with different architectures. The methods and systems disclosed herein may also be practiced in distributed computing environments where tasks are performed by remote processing devices that are linked through a communications network. In a distributed computing environment, program modules may be located in both local and remote memory storage devices.

FIG. 16 is a block diagram representing a general purpose computer system in which aspects of the methods and systems disclosed herein and/or portions thereof may be incorporated. As shown, the exemplary general purpose computing system includes a computer 920 or the like, including a processing unit 921, a system memory 922, and a system bus 923 that couples various system components including the system memory to the processing unit 921. The system bus 923 may be any of several types of bus structures including a memory bus or memory controller, a peripheral bus, and a local bus using any of a variety of bus architectures. The system memory includes read-only memory (ROM) 924 and random access memory (RAM) 925. A basic input/output system 926 (BIOS), containing the basic routines that help to transfer information between elements within the computer 920, such as during start-up, is stored in ROM 924.

The computer 920 may further include a hard disk drive 927 for reading from and writing to a hard disk (not shown), a magnetic disk drive 928 for reading from or writing to a removable magnetic disk 929, and an optical disk drive 930 for reading from or writing to a removable optical disk 931 such as a CD-ROM or other optical media. The hard disk drive 927, magnetic disk drive 928, and optical disk drive 930 are connected to the system bus 923 by a hard disk drive interface 932, a magnetic disk drive interface 933, and an optical drive interface 934, respectively. The drives and their associated computer-readable media provide non-volatile storage of computer readable instructions, data structures, program modules and other data for the computer 920. As described herein, computer-readable media is a tangible, physical, and concrete article of manufacture and thus not a signal per se.

Although the exemplary environment described herein employs a hard disk, a removable magnetic disk 929, and a removable optical disk 931, it should be appreciated that other types of computer readable media which can store data that is accessible by a computer may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on the hard disk, magnetic disk 929, optical disk 931, ROM 924 or RAM 925, including an operating system 935, one or more application programs 936, other program modules 937 and program data 938. A user may enter commands and information into the computer 920 through input devices such as a keyboard 940 and pointing device 942. Other input devices (not shown) may include a microphone, joystick, game pad, satellite disk, scanner, or the like. These and other input devices are often connected to the processing unit 921 through a serial port interface 946 that is coupled to the system bus, but may be connected by other interfaces, such as a parallel port, game port, or universal serial bus (USB). A monitor 947 or other type of display device is also connected to the system bus 923 via an interface, such as a video adapter 948. In addition to the monitor 947, a computer may include other peripheral output devices (not shown), such as speakers and printers. The exemplary system of FIG. 16 also includes a host adapter 955, a Small Computer System Interface (SCSI) bus 956, and an external storage device 962 connected to the SCSI bus 956.

The computer 920 may operate in a networked environment using logical connections to one or more remote computers, such as a remote computer 949. The remote computer 949 may be a personal computer, a server, a router, a network PC, a peer device or other common network node, and may include many or all of the elements described above relative to the computer 920, although only a memory storage device 950 has been illustrated in FIG. 16. The logical connections depicted in FIG. 16 include a local area network (LAN) 951 and a wide area network (WAN) 952. Such networking environments are commonplace in offices, enterprise-wide computer networks, intranets, and the Internet.

When used in a LAN networking environment, the computer 920 is connected to the LAN 951 through a network interface or adapter 953. When used in a WAN networking environment, the computer 920 may include a modem 954 or other means for establishing communications over the wide area network 952, such as the Internet. The modem 954, which may be internal or external, is connected to the system bus 923 via the serial port interface 946. In a networked environment, program modules depicted relative to the computer 920, or portions thereof, may be stored in the remote memory storage device. It will be appreciated that the network connections shown are exemplary and other means of establishing a communications link between the computers may be used.

Computer 920 may include a variety of computer readable storage media. Computer readable storage media can be any available media that can be accessed by computer 920 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 920. Combinations of any of the above should also be included within the scope of computer readable media that may be used to store source code for implementing the methods and systems described herein. Any combination of the features or elements disclosed herein may be used in one or more examples.

In describing preferred examples of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for means for a nestable polymorphic unmanned aerial vehicle which may include shared distributed flight. A method, system, computer readable storage medium, or apparatus has means for programming a polymorphic material to transform based on a condition; and responsive to detecting the condition, instructing an unmanned vehicle to morph to avoid damage or maneuver within a space. Conditions may include at least one of moisture, smoke, temperature, date, time, or weather. A method, system, computer readable storage medium, or apparatus has means for morphing based on a shared flight path include nesting a plurality of unmanned vehicles based on the shared flight path related data; arriving at a first area along the shard flight path; and responsive to arriving at the first area along the shard flight path, detaching a first unmanned vehicle of the plurality of unmanned vehicles based on the shared flight path related data. The method, system, computer readable storage medium, or apparatus has means for sharing a mapping of an assigned second area according to the flight path related data with the plurality of unmanned vehicles. A system may include a mothership device; and a plurality of detachable unmanned vehicles a communicatively connected with the mothership device. The mothership device may be connected to the plurality of detachable unmanned vehicles to move to an area. All combinations in this paragraph (including the removal or addition of steps or components) are contemplated in a manner that is consistent with the other portions of the detailed description. For example, each component or configuration of FIG. 1-FIG. 16 may be combined to include some or all of the components or configurations.

What is claimed is:

1. A system comprising:
  a first unmanned vehicle comprising a first arm and a second arm, wherein the first arm comprises a first portion and a second portion rotatably attached together by a first hinge and the second arm comprises a first portion and a second portion rotatably attached together by a second hinge, and wherein the first portion of the first arm is rotatably connected to the first portion of the second arm by a third hinge; wherein the first portion and the second portion of the first arm and the first portion and the second portion of the second arm are configured to be rotated such that the first arm and the second arm define a substantially diamond shaped space in response to a pressure sensor between the arms detecting a threshold pressure; and
  a second unmanned vehicle, wherein the second unmanned vehicle is configured to:
    determine that the second unmanned vehicle has reached a threshold battery power; and
    connect, based on reaching the threshold battery power, to the first unmanned vehicle by making contact with the pressure sensor and resting within the diamond shaped space.

2. The system of claim 1, wherein first unmanned vehicle is configured to extend the plurality of arms.

3. The system of claim 1, wherein the first unmanned vehicle is configured to charge the second unmanned vehicle connected to the arm.

4. The system of claim 1, wherein the plurality of arms comprise a polymorphic material.

5. The system of claim 1, wherein the first unmanned vehicle comprises at least one of a retracting propeller blade or a folding propeller blade.

6. The system of claim 1, wherein the plurality of arms are telescopic.

7. An apparatus comprising:
  a processor; and
  a memory coupled with the processor, the memory storing executable instructions that when executed by the processor cause the processor to effectuate operations comprising:
  detecting a condition, wherein the condition comprises a first unmanned vehicle reaching a threshold battery power; and
  based on the detecting the condition, causing the first unmanned vehicle to connect to a second unmanned vehicle, wherein the second unmanned vehicle comprises a first arm and a second arm, wherein the first arm comprises a first portion and a second portion rotatably attached together by a first hinge and the second arm comprises a first portion and a second portion rotatably attached together by a second hinge, and wherein the first portion of the first arm is rotatably connected to the first portion of the second arm by a third hinge; wherein the first portion and the second portion of the first arm and the first portion and the second portion of the second arm are configured to be rotated such that the first arm and the second arm define a substantially diamond shaped space in response to a pressure sensor between the arms detecting a threshold pressure, and wherein the first unmanned vehicle connects to the second unmanned vehicle by making contact with the pressure sensor and resting within the diamond shaped space.

8. The apparatus of claim 7, wherein the apparatus comprises the first unmanned vehicle.

9. The apparatus of claim 7, the operations further comprising causing the first unmanned vehicle to store data to the second unmanned vehicle.

10. The apparatus of claim 7, the operations further comprising causing the first unmanned vehicle to connect to a port of the second unmanned vehicle.

11. The apparatus of claim 7, wherein the apparatus comprises a third unmanned vehicle.

12. The apparatus of claim 7, wherein the causing the first unmanned vehicle to connect to the arm of the second unmanned vehicle comprises providing instructions to the first unmanned vehicle to connect with the second unmanned vehicle.

13. The apparatus of claim 7, the operations further comprising providing instructions to at least one of the first unmanned vehicle or the second unmanned vehicle to scan an area and download the data of the scanned area to the apparatus.

14. The apparatus of claim 7, wherein the second unmanned vehicle comprises propellers.

15. The apparatus of claim 7, wherein the second unmanned vehicle comprises at least one of a folding propeller blade or a retracting propeller blade.

16. The apparatus of claim 7, wherein the causing the first unmanned vehicle to connect to the arm of the second unmanned vehicle comprises causing the second unmanned vehicle to extend the arm.

* * * * *